United States Patent Office 3,462,571
Patented Aug. 19, 1969

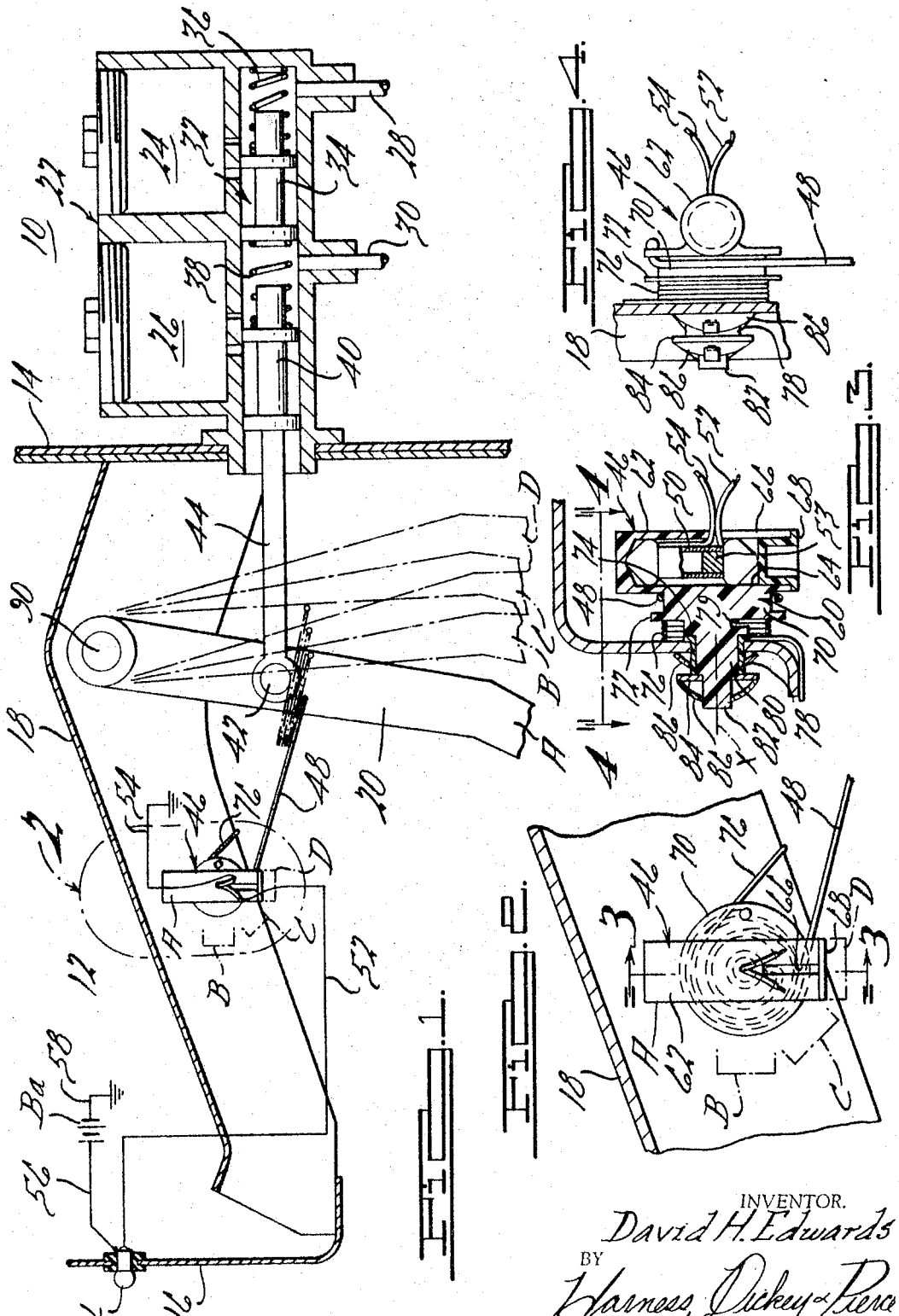

3,462,571
BRAKE EFFECTIVENESS WARNING DEVICE
David H. Edwards, Temperance, Mich., assignor to Kaiser Jeep Corporation, Toledo, Ohio, a corporation of Nevada
Filed Feb. 9, 1967, Ser. No. 615,006
Int. Cl. H01h 3/14
U.S. Cl. 200—61.89     15 Claims

ABSTRACT OF THE DISCLOSURE

Apparatus for sensing brake pedal travel and vehicle deceleration and for providing a warning signal when the travel of the brake pedal is excessive relative to the deceleration of the vehicle obtained for that degree of travel and hence for providing a warning signal related to the effectiveness of the braking system.

---

This invention relates to apparatus for providing a signal responsive to brake effectiveness and more specifically for providing a signal as to the function of brake pedal travel and deceleration of the vehicle.

The device utilizes a mercury switch which, because of the fluidity of the mercury, can be used to sense deceleration; at the same time the switch is connected to the brake pedal to sense brake pedal travel. By properly orienting the switch, a signal can be provided which is a function both of brake pedal travel and of deceleration to thereby provide a warning to the operator that the brake system has in some respects lost effectiveness. It will be noted in greater detail that with the present invention a great number of causes of brake ineffectiveness will be detected and a signal provided to the vehicle operator.

Therefore, it is an object of the present invention to provide a novel device for providing a signal indicating brake ineffectiveness.

It is another object of the present invention to provide apparatus for providing a signal indicating brake ineffectiveness which apparatus is responsive to vehicle deceleration and actuation of the brake system and provides the signal when the magnitude of deceleration and degree of actuation of the brake system are in a predetermined relationship preselected as an indication of loss of brake effectiveness.

It is another object of the present invention to provide apparatus for providing a signal indicating brake effectiveness which apparatus is responsive to a combination of brake pedal travel and vehicle deceleration.

Note that the switching device can be utilized to sense either brake pedal travel or the travel of some other portion of the linkage of the brake system. Alternatively, the switching device could be utilized to sense the force on the brake pedal or on some portion of the linkage or the line pressure to the brakes.

Therefore, it is another object of the present invention to provide a signal indicating the loss of brake effectiveness with the signal being provided primarily as a function of two elements with one of the elements being the effect of the brakes on the vehicle; it is another object to provide a signal with one of the elements being the deceleration of the vehicle.

It is another object of the present invention to provide a signal indicating loss of brake effectiveness with the signal being primarily a function of two elements with one of the elements being the travel of some portion of the brake linkage.

Other objects, features, and advantages of the present invention will become apparent from the subsequent description and the appended claims, taken in conjunction with the accompanying drawings, in which:

FIGURE 1 is a view showing some parts in elevation, some parts in section and some portions schematically and generally being a layout of a preferred form of the present invention;

FIGURE 2 is a view to increased scale of that portion of the drawing of FIGURE 1, generally included in the dot dash line designated by the numeral 2;

FIGURE 3 is a sectional view of the apparatus of FIGURE 2, taken generally along the line 3—3; and FIGURE 4 is a sectional view of the apparatus of FIGURE 3, taken generally along the line 4—4.

Looking now to FIGURE 1, a portion of an automotive vehicle is shown having an engine compartment 10, which is separated from the passenger compartment 12 by a fire wall 14. An instrument panel 16 is located in the passenger compartment 12 and a brake pedal mounting bracket 18 is located generally between the instrument panel and the fire wall 14 and pivotally supports a brake pedal 20. A typical dual brake master cylinder is indicated by the numeral 22 and is located in the engine compartment 10 and is secured to the fire wall 14. The dual brake master cylinder 22 can be of a conventional construction and includes two separate cylinders or reservoirs 24 and 26, which are used to communicate to the front and rear wheel brake lines 28 and 30, respectively. A piston assembly 32 provides fluid pressure to the brake lines 28 and 30 and includes a floating piston member 34 which has springs 36 and 38 located at opposite ends with the spring 38 being located between the floating piston 34 and a connected piston 40. The piston 40 is connected to the brake pedal 20 at the point 42 by a link 44. The dual brake master cylinder 22 functions in a manner well known in the art such that upon depression of the brake pedal 20, the connected piston 40 will be moved inwardly causing flow of fluid and subsequent buildup of pressure in the brake line 30 to effectuate braking of the rear wheels; at the same time the floating piston 34 will be moved by the resulting fluid pressure causing flow of fluid to the brake line 28 to actuate the front brakes. Springs 36 and 38 cause pistons 34 and 40, respectively, to return when the pedal 20 is released. In the event of brake line failure, in either of the brake lines 28 or 30, the other brake line will still be in operation.

A switch assembly 46 is mounted for rotation to the brake pedal mounting bracket 18. A flexible cord 48 connects the assembly 46 to the brake pedal 20 such that as the brake pedal is moved to actuated positions (indicated as A through D) the switch assembly 46 will be rotated to corresponding position (A–D). The switch assembly 46 includes a mercury switch 50 (see FIGURE 3) which is connected by conductors 52 and 54 in series with an indicating light L located at the instrument panel 16; the light L is connected in series with a battery Ba by conductor 56 with the circuit being completed by conductor 58. The mercury switch 50 is normally open and hence the light L is not normally lit.

The amount of fluid flow and fluid pressure applied to the brakes will be related to the amount of travel of the brake pedal 20. Under normal conditions in which the brake system is properly adjusted and in proper operating order, a given amount of travel of the brake pedal 20 will result generally in a known magnitude of deceleration of the vehicle. The puddle of mercury 53 in the mercury switch 50 is oriented such that the gravitational force will move it to make contact or provide for a closed circuit to the light L upon a preselected degree of rotation of the switch assembly 46 when no inertia forces exist on the mercury 53; for positions from position A through position B, the switch 50 would normally be opened. After position B, however, the mercury will flow by gravity to close the switch 50; inertia forces, however, acting on the mercury 53 will tend to prevent movement or flow to a closed position. The magnitude of the total inertia force required to keep the mercury 53 from moving to a closed position will increase as the switch 50 moves to positions from position B to position C; this is because the vector component of the total inertia force resisting movement of the mercury 53 to a closed position decreases with respect to the magnitude of the total inertia force as the angle of rotation of switch 50 increases and because at the same time the vector of the gravitational force tending to move the mercury 53 to a closed position increases as the angle of rotation increases. However, the magnitude of the total inertia force increases with switch rotation (and greater braking) resulting in a higher magnitude for the vector component tending to keep the switch 50 open and thus still overcoming the gravitational force component tending to close switch 50.

The actuation of the switch assembly 46 is self-compensating for grades; the component of the gravity force parallel to the grade is additive or subtractive to the inertia forces to automatically compensate for the grade angle; i.e., uphill it is subtractive, downhill it is additive. The degree of rotation of switch assembly 46, in the construction shown, is a direct function of the magnitude of travel of the brake pedal 20. The mercury switch 50 is so oriented, however, that if at a given position at which the mercury switch 50 would normally be closed, the proper magnitude of deceleration of the vehicle (as effectuated by the brakes through the travel of brake pedal 20 to a corresponding given position) is attained, the inertia forces on the puddle of mercury 53 in the switch 50 will prevent the mercury from flowing to a closed circuit position keeping the switch 50 opened and hence the light L will not be lit. If for a given amount of brake pedal travel of the pedal 20 for some reason the brakes are malfunctioning and the proper amount of deceleration of the vehicle is not attained, then the inertia forces on the puddle of mercury 53 will not be great enough to prevent the mercury from flowing to the closed position of the switch 50. The circuit will be completed and the light L will be lit providing a warning to the operator that a malfunction or some loss of brake effectiveness exists. The various causes for loss of brake effectiveness which will be indicated by the present system will be described later.

As shown in FIGURE 1, the switch assembly 46 will assume the positions A, B, C and D corresponding to positions A, B, C, and D indicated for the brake pedal 20. The switch assembly 46 includes a one-piece plastic housing 60 having a tubular portion 62 having a cavity 64 in which is located the mercury switch 50. One side of the tubular portion 62 is provided with a slot 66 whereby the conductors 54 and 52 can be led out. A cap 68 closes the opening of the cavity 64 and holds the switch 50 in place. Adjacent the tubular portion 62 is a drum portion 70 on which is wound the flexible cable or a cord 48. The drum portion 70 has an enlarged flange 72 to prevent the cord 48 from slipping off. Adjacent to flange 72 is a reduced diameter portion 74 about which is located a return spring 76. The spring 76 has one end 79 connected to the reduced diameter portion 74 and has an opposite end fixed to the bracket 18 such that when the assembly 46 is rotated by movement of the brake pedal 20, upon release of the brake pedal 20 the cord 48 will be rewound upon the drum portion 70 and the switch assembly 46 returned to its released position. The spring 76 maintains tension on the cord 48 even when the brakes are released.

The housing 60 is journaled in a bushing 78 by a further reduced diameter portion 80; the bushing 78 is secured in an opening in the support bracket 18. A small diameter portion 82 on housing 60 extends outwardly beyond the bushing 78 and the housing 60 is axially held to the bushing 78 by means of a spring clip 86 which grips the small diameter portion 82 and engages a washer 84. The bushing 78 is axially fixed to the support bracket 18 by means of a spring clip 86.

As the brake pedal 20 is depressed the cord 48 secured to the brake pedal 20 will cause rotation of the switch assembly 46 tending to move the mercury switch 50 into a position whereby the mercury will close contacts to light the lamp L. However, if the deceleration of the vehicle is of the proper magnitude, corresponding to the degree of depression of pedal 20 (and hence the amount of rotation of the switch assembly 46), then the mercury puddle in the mercury switch 50 will be maintained out of engagement with the contacts and hence the lamp L will remain unlit. If the magnitude of deceleration is less than the proper magnitude for that degree of depression or movement of pedal 20, then the lamp L will be lit providing a warning to the operator. Thus the lamp L will be lit if for a certain deceleration the pedal travel is excessive or more than the designed amount.

The amount of rotation required for the switch assembly 46 will depend upon the characteristics of the vehicle including the characteristics of the braking system as related to the amount of travel of the pedal 20 with regard to known, proper associated magnitude of deceleration of the vehicle. The amount of rotation of the switch assembly 46 can be selected to correspond in a preselected manner to the travel of the brake pedal 20 by several means. First, variation in the location of the point of securing the cord 48 to the brake pedal 20 relative to the brake pedal pivot point 90 will provide for a variation in the amount of rotation of the assembly 46 for a given amount of travel of the brake pedal 20. Additional variation can be obtained by changing the size of the drum portion 70. Further, the drum portion 70 can be provided with a cam surface such that rotation of the switch assembly 46 will not be uniform for travel of the brake pedal 20 but rather will provide for varying degrees of rotation of assembly 46 corresponding to different positions of the brake pedal 20 as related to a corresponding known magnitude of deceleration of the vehicle for these brake pedal positions.

The brake effectivenes warning system as described, will function generally on any grade to provide a warning to the vehicle operator if any one of the following conditions exists: (1) a warning signal will occur if the brake lines or any other part of the hydraulic system is damaged and is leaking, worn, cracked, plugged, etc., or is subject to any other defects such that the proper fluid pressure buildup to the brakes cannot occur; in these situations, the proper magnitude of deceleration will not be attained for a given amount of travel of brake pedal 20 and the warning light L will be lit; (2) in the event of low fluid level in either of the reservoirs 24 or 26, excessive brake pedal travel 20 will occur for a given magnitude of deceleration and lamp L will be lit; (3) if the brake shoes are out of adjustment requiring an excessive amount of fluid to the fluid lines 28, 30, the brake pedal 20 will travel to a greater extent than normally required for the same magnitude of deceleration resulting in lighting of the lamp L; (4) if the brake linings are overheated or faded, water soaked, greasy or worn out, then a given amount of travel of the brake pedal 20 will not result in the proper magnitude of deceleration of the vehicle and again the lamp L will be lit; (5) if the vehicle is overloaded or is pulling an excessive load, again the magnitude of deceleration of the vehicle will not properly correspond to the degree of travel of the brake pedal 20 and the light L will be lit; and (6) improperly assembled or defective parts that prevent proper pressure buildup can be indicated by the system as shown and described. The above list is by way of example only of the various conditions which will actuate the system.

The present system is operable to provide a signal generally in response to the effect of the brake system on the vehicle. In a vehicle moving down a grade, it is common to keep the brakes constantly actuated to maintain a constant vehicle speed. Under these conditions there will be no deceleration; however, upon the linings becoming overheated and fading the brake pedal 20 will be further depressed to maintain the same velocity; upon excessive travel of the pedal 20, the light L will be lit by the switch 50 solely due to the gravitational component of force upon the puddle of mercury 53. Thus the switch 50 will be affected by the grade angle to provide a warning indicating brake ineffectiveness. Thus the warning system is effective to provide a warning in response to the effect of the brakes on the vehicle.

It is desirable that some means be provided whereby the vehicle operator can be assured that the system is properly functioning, i.e., that the lamp L has not been burned out, that the switch 50 has not been damaged, etc. A system check can be readily provided merely by applying the brake while the vehicle is in a standing position or by applying the brake when the vehicle is moving in reverse. In either condition, if the system is properly functioning, the lamp L should light.

The mercury in the switch 50 being fluid, a false indication could occur by the mercury splashing when the brake pedal 20 is quickly released and the switch assembly 46 is quickly returned by spring 76. In order to prevent the mercury from splashing and a corresponding false indication from the lamp L, the mercury switch 50 is mounted with the puddle or pool of mercury located proximate to the center line of the pivot axis X of the switch assembly 46. In this way, quick release of the brake pedal 20 will not result in the occurrence of a false signal by the lamp L.

While the system is shown for a dual brake master cylinder 22, it is equally applicable to a single master cylinder construction. The system is also applicable to vehicles having power brakes. Instead of or in addition to the light L, an audible signal could be provided.

Other brake effectiveness sensing systems have been designed to sense only the loss of fluid pressure; the system of the present invention provides not only an indication of loss of fluid pressure but also provides an indication of literally any decrease in brake effectiveness, and hence can more comprehensively inform the vehicle operator of the operative condition of the vehicle brake system.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a brake system for a vehicle and actuable for decelerating the vehicle a brake effectiveness warning system for providing a signal indicating a loss of effectiveness of the brake system of the vehicle comprising: switch means normally in a first condition and actuable to a second condition, said switch means including first means for varyingly urging said switch means to said second condition in response to variations in the magnitude of the deceleration of the vehicle and second means for varyingly urging said switch means to said second condition in response to variations in the magnitude of degree of actuation of the brake system, said first and second means being effective for actuating said switch means to said second condition upon the occurrence of a condition in which the magnitude of the deceleration of the vehicle and the magnitude of the degree of actuation of the brake system are in a predetermined relationship preselected as an indication of loss of brake effectiveness and means responsive to said switch means being in the second condition for providing the signal.

2. The system of claim 1 with said first means being responsive to the grade angle encountered by the vehicle for varying the effect of variations in the magnitude of the deceleration of the vehicle in response to variations in said grade angle.

3. The system of claim 1 with said second means being connected with the linkage of the brake system for sensing the degree of actuation of the brake system.

4. The system of claim 1 with said first means being connected to the brake pedal with the degree of actuation of the brake system being sensed as the amount of movement of the brake pedal.

5. The system of claim 1 with said switch means including a mercury switch.

6. The system of claim 1 with said switch means including a switch member and with said first means including one part of said switch member movable in response to the deceleration of the vehicle and with said second means including another part movable in response to actuation of the brake system.

7. The system of claim 6 with said one part supported for movement with said another part.

8. The system of claim 1 with said switch means including a switch assembly and with said second means connecting said switch assembly to the brake linkage for moving said switch assembly as the brake linkage is moved.

9. The system of claim 8 with said second means supporting said switch assembly for rotation in response to movement of the brake linkage.

10. The system of claim 9 with said second means comprising a flexible cord and a drum associated with said switch assembly for receiving said cord as said switch assembly is rotated.

11. The system of claim 10 with said drum contoured to provide a cam surface whereby the magnitude of rotation of said switch assembly per linear travel of said cord will vary in accordance with a selected pattern.

12. The system of claim 10 with said switch assembly including a mercury switch.

13. The system of claim 12 with said mercury switch located to have the mercury in the switch located near the axis rotation of said switch assembly in said first condition.

14. The system of claim 13 with said switch assembly including spring means for biasing said drum to rotate in a direction to retract said cord and for returning said switch assembly to an original position upon release of the brake linkage on deactuation of the brake system.

15. The system of claim 14 with said cord being connected to the brake pedal.

References Cited

UNITED STATES PATENTS

| | | | |
|---|---|---|---|
| 1,510,912 | 10/1924 | Allen | 200—61.89 XR |
| 1,536,049 | 5/1925 | Allen | 200—153.6 |
| 2,857,584 | 10/1958 | Gibson | 200—61.89 XR |

ROBERT K. SCHAEFER, Primary Examiner

M. GINSBURG, Assistant Examiner

U.S. Cl. X.R.

340—60